United States Patent [19]

Moldovan et al.

[11] 4,008,309

[45] Feb. 15, 1977

[54] PROCESS FOR CRYSTALLIZING CALCIUM NITRATE

[75] Inventors: Juliu Virgil Florian Moldovan; Maria Suciu; Eugenia Tomescu, all of Bucharest, Romania

[73] Assignee: Institutul de Cercetari Chimice - Icechim, Bucharest, Romania

[22] Filed: May 12, 1975

[21] Appl. No.: 576,305

Related U.S. Application Data

[63] Continuation-in-part of Ser. No. 338,815, March 7, 1973, abandoned, which is a continuation of Ser. No. 103,327, Dec. 31, 1970, abandoned.

[30] Foreign Application Priority Data

Jan. 7, 1970 Romania .................. 62059

[52] U.S. Cl. ............................. 423/167; 23/304; 423/395
[51] Int. Cl.$^2$ ......................... C01F 11/44
[58] Field of Search .................. 423/167, 319, 395; 23/304; 71/39

[56] References Cited

UNITED STATES PATENTS

| | | | |
|---|---|---|---|
| 1,816,285 | 7/1931 | Johnson | 423/167 |
| 1,939,351 | 12/1933 | Johnson | 423/167 |
| 2,252,280 | 8/1941 | Balz | 423/167 |
| 2,609,271 | 9/1952 | Plusje | 423/167 |
| 2,813,777 | 11/1957 | Swenson | 23/304 |
| 3,205,062 | 9/1965 | Gattiker et al. | 71/39 |

FOREIGN PATENTS OR APPLICATIONS

| | | | |
|---|---|---|---|
| 33,843 | 1/1965 | Germany | 23/304 |
| 51,650 | 12/1969 | Romania | 23/304 |
| 932,215 | 4/1960 | United Kingdom | 423/167 |

*Primary Examiner* — Morris O. Wolk
*Assistant Examiner* — Arnold Turk
*Attorney, Agent, or Firm* — Karl F. Ross; Herbert Dubno

[57] ABSTRACT

Large-sized calcium nitrate tetrahydrate particles are obtained by dissolving phosphate rock in concentrated nitric acid, cooling the resulting solution, intentionally terminating the crystallization of the calcium nitrate tetrahydrate when only 40 to at most 60% of the calcium in solution has been crystallized, to form a mother liquor, recovering a portion of the mother liquor equivalent to 20 to 80% of the solution by removing the calcium nitrate crystals therefrom; combining the remainder of the suspension with the separated mother liquor and recovering the crystals with a particle size of from 70 to 1100 microns.

6 Claims, No Drawings

PROCESS FOR CRYSTALLIZING CALCIUM NITRATE

CROSS-REFERENCE TO RELATED APPLICATION

This application is a continuation-in-part of Ser. No. 338,815 filed Mar. 7, 1973, (now abandoned), as a continuation of now abandoned application Ser. No. 103,327 of Dec. 31, 1970.

FIELD OF THE INVENTION

The invention relates to a process for crystallizing calcium nitrate from solutions obtained by the action on phosphate rock of nitric acid to obtain large-sized calcium nitrate crystals and to attain an improved separation of calcium from the phosphonitrate solutions.

Background of the Invention

Processes are already known that provide for the crystallization of calcium nitrate by directly or indirectly cooling the phosphonitrate solutions in a single step or in two or more cooling steps; other processes are known too in which crystal seeds (nuclei) are introduced into the phosphonitrate solution before cooling. The more or less improved crystallization of the calcium nitrate from the phosphonitrate solution is followed by a step for separating the crystals by filtration or centrifuging.

In these processes, it has not been possible to obtain concomitantly, large-sized calcium nitrate crystals, which are easily filtrable and washable, as well an improved separation of calcium nitrate from the phosphonitrate solution moreover; these processes do not avoid the main drawback of accelerated cooling of the phosphonitrate solutions. The phosphonitrate solution is fluid at the beginning of crystallization but is suddenly transformed into a compact crystalline mass, which cannot be further stirred or cooled and hence cannot be discharged from the crystallizing vessels for filtering or centrifuging, thus practically limiting to a maximum of 65% the degree of separation from phosphonitrate solutions.

Processes that require the introduction of crystal seeds into the phosphonitrate solution produce a spontaneous crystallization leading to the formation of small sized calcium nitrate crystals, below 100 microns in particle size. In this case, filtration is difficult and a large portion of the mass of small crystals passes into the filtered phosphonitrate solution.

DESCRIPTION OF THE INVENTION

The process according to the invention avoids the above-mentioned disadvantages in that, in order to obtain large-sized calcium nitrate crystals and an increased separation of calcium, in the first crystallization step we form a suspension containing as the solid phase, in the form of calcium nitrate crystals, 40 to 60% of the calcium existing in the phosphonitrate solution by cooling the latter down to 17° to 22° C at a constant rate of cooling comprised between 6° and 30° C/hour, preferably 12° C/hour, as a function of the desired crystal size; in the second crystallization step, the suspension resulting from the first crystallization step is diluted so that after completion of the crystallization a liquid:solid ratio in a range between 1:1 and 1:0.9, is obtained. Calcium nitrate crystals are further formed up to a calcium separation yield of 80 to 85% by cooling in the second phase to a temperature in the range between +12° and −10° C, preferably −5° C, depending on the desired degree of separation of the calcium nitrate, at a rate of cooling in the range between 12° and 40° C/hour, preferably 25° C/hour.

Cooling in the first crystallization step is ended upon attaining or finally overstepping the characteristic point for the formation of calcium nitrate crystals; at this point there is first an increase in the solution temperature or the temperature is constant, then the cooling is continued at the original rate of cooling until the point at which the temperature jump occurred is attained or until the temperature begins to drop below this point by 1° C, thereby yielding the 40 to 60% crystallization of Ca as the nitrate.

The liquid: solid ratio required in the second crystallization step is achieved by diluting, in a ratio of 1:2 to 1:0.1, the primary crystallized phosphonitrate solution with the mother solution obtained by the removal of 40 to 60% of the calcium nitrate from part of the suspension obtained after the first crystallization step or with a part of the mother solution resulting after separation of the calcium nitrate subsequent to the second crystallization step.

The phosphate rock employed in the process has a calcium oxide concentration of from 10 to 60% by weight.

The nitric acid employed in the process has a concentration of from 30 to 70% by weight.

During the constant cooling step a temperature fall break occurs. A temperature fall break is defined as a point of inflection along curve of time plotted against temperature for a constant cooling rate.

The crystallization is intentionally halted when 40 to at most 60% of the calcium nitrate tetrahydrate is precipitated and a mother liquor is then produced with the crystals in suspension. Next, 20 to 80% of the suspension is subjected to recovery of its mother liquor by removing calcium nitrate tetrahydrate crystals therefrom.

As far as the particle size of the resultant calcium nitrate tetrahydrate is concerned, the range is from a high of 1100 microns to a low of 70 microns. However, over 90% of the particles are within the range of from 120 to 900 microns. The preferred particle size range is between 350 and 500 microns with an average size of 450 microns.

Tests 1 to 6 below represent the first step of crystallization, tests 6 through 8 represent the second crystallization step (that is the crystallization made in the presence of mother liquor recovered after the crystallization of from 40 to at most 60% of the calcium nitrate tetrahydrate) and tests 9–11 represent the complete process.

| No. | Cooling temp. of the initial final test | | Cooling rate | Residence time at final t | Crystallization output | Crystal size max. avg min | | |
|---|---|---|---|---|---|---|---|---|
| | +°C | °C | °C/h | h | % | microns | | |
| 1. | 50 | 18 | 7 | 0 | 60 | 1220 | 810 | 130 |

-continued

| No. | Cooling temp. of the initial final test +°C | Cooling final test °C | Cooling rate °C/h | Residence time at final t h | Crystallization output % | Crystal size max. | Crystal size avg | Crystal size min |
| --- | --- | --- | --- | --- | --- | --- | --- | --- |
| 2.  | 50 | 18  | 12   | 0 | 60.2 | 1300 | 700±50 | 300 |
| 3.  | 60 | 18  | 12   | 2 | 60.2 | 1300 | 700±50 | 300 |
| 4.  | 37 | 18  | 12   | 3 | 60.0 | 1300 | 700±50 | 300 |
| 5.  | 60 | 18  | 16.7 | 0 | 60.8 | 1020 | 520    | 120 |
| 6.  | 60 | 18  | 23   | 0 | 50   | 900  | 550±50 | 120 |
| 7.  | 60 | 18  | 22.6 | 0 | 60   | 900  | 450    | 120 |
| 8.  | 60 | 12  | 25   | 0 | 59   | 800  | 400±50 | 180 |
| 9.  | 58 | −3  | 2    | 0 | 78   | 1350 | 855    | 90  |
| 10. | 49 | −10 | 5.5  | 0 | 82.5 | 1485 | 850    | 90  |
| 11. | 50 | −10 | 10   | 0 | 82   | 1350 | 700±50 | 90  |

SPECIFIC EXAMPLES

EXAMPLE 1

200 g of calcined Israel phosphate rock milled to 0.5 mm and having 35.0% $P_2O_5$ and 56.2% CaO, were decomposed in a reaction vessel with 372 g of 58% nitric acid and with 125 g of a recycle acid solution resulting from washing the calcium nitrate crystals and having the following composition: $P_2O_5$ 13.39 g, CaO 11.4 g, and nitrate nitrogen 17.85 g. The decomposition was carried out at 60° C for 60 minutes. An amount of 687 g of phosphonitrate solution was thus obtained, having total $P_2O_5$ content 83.39 g, water-soluble $P_2O_5$ 82.7 g, CaO 123.4 g and nitrate nitrogen 65.65 g.

The previously cooled (to 40° C) phosphonitrate solution was introduced into a crystallizing vessel, in which it was cooled under moderate stirring at a constant rate of 12° C/hour. When the temperature of 17° C in the phosphonitrate solution was attained, a temperature jump to 24.5° occurred. The phosphonitrate solution was cooled in continuation from 24.5° to 17° C at the same constant rate of cooling of 12° C/hour. During the temperature jump and when the temperature of the pulp had again reached 17° C, a more rapid crystallization of the calcium nitrate took place. Before the temperature jump, the phosphonitrate solution did not contain calcium nitrate crystals. With this, the first step of cooling the phosphonitrate solution comes to an end.

Subsequently, 543.5 g of the phosphonitrate solution cooled to 17° C as passed to the next step of crystal separation, from which 189.5 g of first step mother solution were obtained, having the following composition: $P_2O_5$ 36.73 g, CaO 25.3 g, and nitrate nitrogen 14.82 g. 154 g of crystals were recovered and subsequently washed with 31 g of 58% nitric acid and 141 g of $Ca(NO_3)_2$ 4 $H_2O$ crystals were obtained, having a content of $P_2O_5$ 3.98 g, CaO 4.10 g and nitrate nitrogen 6.1 g. The 189.5 g of phosphonitrate solution mother liquid cooled to 17° C and the remainder of the phosphonitrate solution from which the crystals had not been separated were subsequently cooled at low temperature by introducing both solutions into a crystallizing vessel, in which they were further cooled under moderate stirring at a constant rate of cooling of 18° C/hour from 17° C to −5° C. This phosphonitrate solution, in a total amount of 533 g, had a solid to liquid ratio of 1:0.9. The phosphonitrate solution cooled to −5° C was subjected to crystal separation, obtaining thereby 253 g of final mother solution with $P_2O_5$ 67.48 g, CaO 21.5 g and nitrate nitrogen 16.24 g, as well as 280 g of unwashed calcium nitrate crystals with 4 $H_2O$, having a content of $P_2O_5$ 10.60 g, CaO 65.5 g, and nitrate nitrogen 31.4 g. The unwashed crystals were subsequently washed with 55 g of 58% nitric acid, and 81 g of an acidic second washing solution were obtained, having a content of $P_2O_5$ 9.41 g, CaO 7.30 g and nitrate nitrogen 11.75 g, as well as 254 g of washed calcium nitrate crystals, with $P_2O_5$ 1.19 g, CaO 58.2 g and nitrate nitrogen 26.65 g. The first acidic washing solution together with the second acidic washing solution, which combined contained 125 g of acid solutions with $P_2O_5$ 13.39 g, CaO 11.40 g, and nitrate nitrogen 17.85 g, having a free acidity corresponding to 50.4% of $HNO_3$, were recycled to the decomposition step. The washed $Ca(NO_3)_2$ 4 $H_2O$ crystals from the first crystallization step, as well as from the second crystallization step, had a largest size of 900 microns, an average size of 400 microns, and a minimum size of 250 microns.

EXAMPLE 2

By attacking 200 g of Morocco phosphate rock with a fineness of 0.25 mm with 362.5 g of 58% nitric acid and with 269 g of an acid resulting from washing the crystals obtained in the first crystallization step, 819.6 g of phosphonitrate solution were obtained, having the following compositions: $P_2O_5$ 9.75%, CaO 15.8% and nitrate nitrogen 9.36%, that is $P_2O_5$ 79.5 g, CaO 130 g and nitrate nitrogen 76.53 g.

The solution was divided into two equal parts. 409.8 g of phosphonitrate solution were introduced into a crystallizing vessel and submitted to a first step of crystallization by cooling at a rate of 12° C/hour down to a temperature of 16° C, at which point a rapid rise in the solution temperature from 16° C to 21° C was recorded. After this jump, the solution was further cooled at the same rate down to the temperature of 16° C; then 185 g of calcium nitrate crystals were separated by centrifuging, which had a content of $P_2O_5$ 51.65%, CaO 21.8% and nitrate nitrogen 10.5% as well as 224 g of mother liquor with a content of $P_2O_5$ 11.2%, CaO 10.8% and nitrate nitrogen 7.9%.

The crystals were washed with 169 g of 58% nitric acid of a temperature of 20° C, when 26 g of washing solution having $P_2O_5$ 3.71%, CaO 8.1% and nitrate nitrogen 10.90%, which was recycled to the attack step, and 85 g of washed crystals having a largest size of 850 microns, minimum size of 70 microns and average size of 450 microns, were separated.

In another crystallizing vessel, the second half of the phosphonitrate solution, that is 409.8 g of phosphonitrate solution, was cooled under the same conditions as above, and a temperature jump from 16° C to 21° C occurred, after which the solution was further cooled at a rate of 12° C/hour until reaching the temperature of 16° C, resulting in the partly crystallized phosphonitrate solution.

The mother solution separated by filtering the first fraction in an amount of 224 g was mixed under stirring with partly crystallized phosphonitrate solution of the second fraction in an amount of 409.8 g, and cooling was continued at a rate of 24° C/hour down to the temperature of −5° C, when the mixture was submitted to centrifuging.

From the solution 314.4 g of calcium nitrate crystals were separated, having a content of $P_2O_5$ of 4.1%, CaO 23% and nitrate nitrogen 14.1%.

The liquid: solid ratio before separating the crystals from the phosphonitrate solution was about 1:0.98.

The calcium separation yield with respect to total amount of calcium in the initial phosphonitrate solution was 81%. After separation, the crystals were washed with 110 g of 58% nitric acid of a temperature of 0° C; the washing solution is then collected together with the mother solution resulting from the second crystallization step.

Finally, 492.4 g of final solution were obtained, having a content of $P_2O_5$ of 78.3 g, CaO 31.5 g and nitrate nitrogen 40.1 g, that is $P_2O_5$ 15.8%, CaO 6.4% and nitrate nitrogen 8.1%, as well as 251.4 g of washed calcium nitrate crystals having a content of $P_2O_5$ 0.51%, CaO 23.1% and nitrate nitrogen 11.62%, and a largest size of 1100 microns an average size of 500 microns and a minimum size of 90 microns.

EXAMPLE 3

303.9 g of phosphonitrate solution obtained by attacking 100 g of Morocco phosphate rock with 228 g of 58% nitric acid, having a content of CaO of 16.62% and of $P_2O_5$ of 11.83%, were introduced into a crystallizing vessel. The solution was cooled at a rate of cooling of 12° C/hour, and when the temperature of the solution reached 20° C, a temperature rise from 20° to 24° C was recorded. The solution was then further cooled at the same rate of 12° C/hour until it again reached 20° C. At this instant, into the solution were introduced under stirring 95 g of mother solution with washing acid, coming from the second step of another sample subjected to crystallization, which had a content of $P_2O_5$ of 14.94%, and CaO 4.28%, cooling being continued at a rate of 30° C/hour until reaching the temperature of −5° C. The crystal suspension was filtered and centrifuged, obtaining thus 210 g of calcium nitrate crystals having a content of CaO of 20% and of $P_2O_5$ of 0.51%, a largest size of 350 microns, minimum size of 110 microns and an average size of 200 microns. In this case the liquid: solid ratio had been of about 1:1.1. By centrifuging, an amount of 110 g of mother solution was also obtained, having a content of CaO of 2.61% and of $P_2O_5$ 17.45%, the rest of the solution being included in the filtered crystals.

When applying the invention, in a first crystallization step, a moderate cooling of the phosphonitrate solution must be used, in order that about 40 to 60% of the calcium existing in the phosphonitrate solution is separated in form of large sized calcium nitrate crystals (the 60% limit is intentionally observed) and namely so much larger sized as the crystallization rate is lower, the size of the calcium nitrate crystals being comprised between at least 100 microns and at most 1400 microns, with an average of 400 to 800 microns.

To this end the phosphonitrate solution subjected to crystallization is cooled directly or indirectly at a constant rate of cooling in the range between 6° Ch and 30° C/h, preferably 12° C/h, as a function of the desired crystal size, until a heat evolution is obtained, characterized either by a rise of the phosphonitrate solution temperature or by a constant temperature in the phosphonitrate solution during its cooling at the selected constant rate. This is a characteristic point that can accurately specify the temperature at which the formation of the calcium nitrate crystals occurs and thus the point at which the first crystallization step comes to an end under the conditions of separating a minimum amount of calcium nitrate crystals this corresponding to the separation of about 40 to 60% of the calcium existing in the phosphonitrate solution. Said heat evolution, in the first step of crystallization, occurs at a temperature comprised between 17° and 22° C as a function of the composition of the phosphate rock used and of the composition of the acid solution used in attacking the phosphate rock, hence of te composition of the phosphonitrate solution.

After the characteristic point, when the temperature jump occurs, the cooling of the phosphonitrate solution is continued, while maintaining the initial rate of cooling constant either until the phosphonitrate solution temperature again attains the temperature at which the temperature jump occurred or, in case a steady value of the phosphonitrate solution temperature has been recorded, until the phosphonitrate solution temperature begins to fall again below this point by 1° C. This critical point exactly limits the moment at which may be separated under optimal conditions the minimum amount of calcium nitrate from the phosphonitrate solution. At the critical point or below this point either the partial separation of the calcium nitrate crystals from the phosphonitrate solution by filtration or centrifuging and the passing of the filtrate, termed herein the mother solution, to the second crystallization step, or the processing of the phosphonitrate suspension termed herein the primary crystallized phosphonitrate solution, without prior separation of the calcium nitrate crystals, in the second crystallization step.

In the case of the filtration or centrifuging of the phosphonitrate solution, the calcium nitrate crystals are washed with nitric acid, having an identical concentration to that utilized for attacking phosphate rock, and the acid resulting from the washing of the calcium nitrate crystals is either recycled for the attacking of the phosphate rock or introduced totally or partly into the mother solution. The nitric acid used for washing the calcium nitrate crystals may have a temperature of about 0° C, in order to thus diminsh the degree of dissolving the calcium nitrate in the washing acid.

In the second crystallizaton step, in which the phosphonitrate solution is subjected to cooling at lower temperatures, a ratio liquid to solid of 1:1 to 1:0.1, preferably 1:0.9 has to be maintained, that is a ratio that allows keeping the fluidity of the phosphonitrate solution during the whole performing of the cooling even at lower crystallization temperatures.

To achieve this crystallization step, a part of the initial phosphonitrate solution is spent in the obtaining of the mother solution, while another part is maintained as a primary crystallized phosphonitrate solution. At the critical point temperature or below this temperature, the primary crystallized phosphonitrate solution is mixed by stirring with the mother solution in a ratio of 1:2 to 1:0.1, so that at the end of the advanced cooling step the final liquid-solid ratio shall be of at least 1:0.9. This ratio may be much exceeded when the ratio of primary crystallized phosphonitrate solution to mother solution is about 1:2, when in fact the large sized crystals of the primary crystallized phosphonitrate solution serve as crystal nuclei in the second crystallization step. The mother solution has exactly the composition of the liquid phase of the primary crystallized phosphonitrate solution; after mixing the two solutions, the crystallization parameters are not changed by this dilution. After mixing the two solutions, the cooling is continued with a constant cooling rate, equal to or higher than that of the first crystallization step, and namely with a cooling rate comprised between 12° to 40° C/h, preferably 25° C/h, down to a temperature comprised between +12° C and −10° C; the final cooling temperature depends on the desired degree of separation of calcium nitrate from the phosphonitrate solution, as well as on the composition of the phosphonitrate solution. The cooled solution is filtered or centrifuged, and the calcium nitrate crystals are washed with cold nitric acid. The acid resulting from washing is recycled to the attacking of phosphate rock or introduced totally or partly into the filtrate obtained by the separation of calcium nitrate crystals from the finally crystallized solution.

The final liquid to solid ratio of 1:1 to 1:0.1, preferably 1:0.9, may also be attained by mixing under stirring at the critical point temperature or below this temperature the primary crystallized phosphonitrate solution with a corresponding part of the finally crystallized phosphonitrate solution from which the crystals were separated; the advanced cooling of the so diluted phosphonitrate solution is then continued; the calcium nitrate crystals are separated and washed under the above conditions, the acid resulting from washing is recycled to the attack step, and the filtrate is partly recycled to the second crystallization step.

The present invention offers the following advantages:

There is achieved a perfectly controlled and reproducible crystallization and increased separation of the calcium nitrate independent of the composition of the phosphate rock or of the nitric acid used for obtaining the phosphonitrate solution;

It allows maintenance (during the whole cooling operation) of the fluidity of the crystallizing phosphonitrate solution, even at maximum cooling, and facilitates stirring the solution, with a good heat transfer and optimal conditions for the formation of calcium nitrate crystals, which are easily filterable and washable with a minimum of liquid.

We claim:

1. A process for preparing large calcium nitrate tetrahydrate crystals comprising the steps of:
    a. digesting phosphate rock containing from about 10 to 60% CaO by weight with nitric acid of 30 to 70% concentration by weight to produce a phosphonitrate solution;
    b. cooling said solution at a substantially constant rate of substantially 6° to 30° C per hour to a temperature of substantially 17 to 22° C through a temperature fall break, a point of inflection in the characteristic curve of time plotted against temperature with constant cooling rate to crystallize calcium nitrate tetrahydrate and
    c. ceasing cooling upon the temperature dropping about 1° C below the temperature at said point thereby intentionally terminating the crystallization when only 40 to at most 60% of the calcium nitrate tetrahydrate is precipitated so as to produce a mother liquor with the resulting crystals in suspension;
    d. recovering the mother liquor from 20 to 80% of the suspension produced in step (c) by removing the calcium nitrate tetrahydrate crystals therefrom;
    e. combining the remainder of the suspension produced in step (c) with the mother liquor produced in step (d) to form a mixture thereof in a ratio of said remainder of the suspension: mother liquor of step (d) of from 1:2 to 1:0.1 and cooling the resultant mixture at a rate of substantially 12° to 40° C per hour and at a rate at least equal to that of step (b) to a temperature between substantially 12° C and −10° C to crystallize calcium nitrate tetrahydrate from the mixture and precipitate 80 to 85% of the calcium thereof in the form of the crystals of calcium nitrate tetrahydrate having a particle size of from 70 to 1100 microns to produce a crystal-containing liquid with a mother liquor/crystal ratio of substantially from 1:1 to 1:0.1; and
    f. removing said crystals with a particle size of from 700 to 1100 microns from said liquid.

2. The process defined in claim 1, wherein in step (f) the particles recovered have a size of between 120 and 900 microns.

3. The process defined in claim 1, wherein in step (f) the particles recovered have a size of between 350 and 500 microns.

4. The process defined in claim 3 wherein the average particle size is 450 microns.

5. The process defined in claim 1 wherein in step (e) the rate of cooling the resultant mixture is 35° C per hour.

6. The process defined in claim 1 wherein in step (e) the resulting mixture is cooled to a temperature of −5° C.

* * * * *